United States Patent [19]
Vincent, Jr. et al.

[11] Patent Number: 5,499,643
[45] Date of Patent: Mar. 19, 1996

[54] CLEANING APPARATUS FOR REMOVING OILY WASTE

[76] Inventors: C. Elmas Vincent, Jr., 20022 N. 2nd Dr., Phoenix, Ariz. 85027; Anthony Galanis, 2144 Glacier, Idaho Falls, Id. 83401

[21] Appl. No.: 420,248

[22] Filed: Apr. 11, 1995

[51] Int. Cl.⁶ ........................................ B08B 3/04
[52] U.S. Cl. ........................ 134/104.4; 134/109; 134/155; 210/521
[58] Field of Search .................... 134/104.2, 104.4, 134/107, 109, 110, 111, 155; 210/521, 522, 538; 15/320

[56] References Cited

U.S. PATENT DOCUMENTS

| | | | |
|---|---|---|---|
| 2,675,012 | 4/1954 | Scales | 210/521 X |
| 3,610,260 | 10/1971 | Kearney | 134/109 |
| 3,847,813 | 11/1974 | Castelli | 210/232 |
| 3,951,818 | 4/1976 | Bosnjak | 210/522 |
| 3,957,656 | 5/1976 | Castelli | 210/521 |
| 4,123,365 | 10/1978 | Middelbeck | 210/521 |
| 4,194,263 | 3/1980 | Herpers et al. | 15/320 |
| 4,273,654 | 6/1981 | Pielkenrood | 210/232 |
| 4,333,835 | 6/1982 | Lynch | 210/305 |
| 4,377,017 | 3/1983 | Herpers et al. | 15/320 |
| 4,544,487 | 10/1985 | Bosnjak | 210/522 |
| 4,643,834 | 2/1987 | Batutis | 210/740 |
| 4,717,475 | 1/1988 | Brandt et al. | 210/237 |
| 4,722,800 | 2/1988 | Aymong | 210/802 |
| 4,817,649 | 4/1989 | Schmalz, Jr. | 134/58 R |
| 4,915,823 | 4/1990 | Hall | 210/521 |
| 4,960,513 | 10/1990 | Young | 210/104 |
| 5,068,035 | 11/1991 | Mohr | 210/236 |
| 5,143,102 | 9/1992 | Blaul | 134/58 R |
| 5,173,195 | 12/1992 | Wright et al. | 210/802 |
| 5,232,299 | 8/1993 | Hiss | 401/143 |
| 5,242,604 | 9/1993 | Young et al. | 210/768 |
| 5,303,725 | 4/1994 | Hilpen | 134/56 R |
| 5,310,481 | 5/1994 | Rondano | 210/86 |
| 5,422,019 | 6/1995 | Carman | 134/109 |

FOREIGN PATENT DOCUMENTS

| | | | |
|---|---|---|---|
| 297476 | 1/1992 | Germany | 210/521 |
| 56-52605 | 12/1981 | Japan | 210/521 |
| 1710517 | 2/1992 | U.S.S.R. | 210/521 |

OTHER PUBLICATIONS

Five (5) pages of information concerning phase separation system available from Pha Sep, 1111 Jenkins Rd., Gastonia, N.C. 28052—Date of Publication unknown.

Primary Examiner—Frankie L. Stinson
Attorney, Agent, or Firm—Charles E. Cates; Richard G. Harrer

[57] ABSTRACT

A cleaning apparatus for removing oily waste from articles which includes two tanks located in proximity, preferably in side-by-side relationship, to one another. The upper edge of one end of these tanks is provided with an overflow that causes the light surface fraction of the liquid in the cleaning tank to flow out of the cleaning tank and onto the surface of the liquid in the separating tank. The bottom edge of the opposite end of the separating tank is provided with an outlet through which the dense bottom fraction of the liquid in the separating tank may be withdrawn and pumped back into the cleaning tank. The effect of this top/bottom relationship between outlets and inlets is to establish a density gradient which favors the migration of oily waste from the cleaning tank to the separating tank.

Additionally, flow of fluid from the cleaning tank is directed into the separating tank so that a unidirectional flow pattern is established in the separating tank, while a circulatory flow pattern is established in the cleaning tank.

Another feature is the inclusion within the separating tank of a waste separating assembly which includes an array of parallelly disposed rigid plates composed of an oleophilic material such as polypropylene, and which include large numbers of relatively small openings. The assembly promotes and hastens the coalescence of oily waste into globules large enough to rise rapidly to the surface of the liquid in the separating tank where they can be easily removed.

17 Claims, 4 Drawing Sheets

CLEANING APPARATUS FOR REMOVING OILY WASTE

BACKGROUND OF THE INVENTION

The present invention relates to cleaning apparatuses for removing oily waste from articles to be cleaned, and is directed more particularly to cleaning apparatuses that make use of water-based cleaning liquids. Cleaning apparatuses of this type are also commonly referred to as parts washers or cleaners.

The machining and use of articles such as machine parts, automobile parts, etc. often leaves these articles contaminated by a coating or film of oily waste. In the case of machine parts this coating often includes particles or chips of metal produced during machining. In the case of auto parts this coating often holds particles of dirt dust and the like that become trapped therein during driving. In order to remove such particles, and prevent the trapping of additional particles, it is necessary to remove substantially all of the oily waste that serves as the retaining matrix thereof.

Prior to the present invention many different approaches have been used in an attempt to safely and efficiently solve this problem. One class of these approaches has been the use of non-polar organic cleaning liquids such as kerosene, gasoline, hexane, etc. which act as solvents for oily waste. While these materials are highly effective, their flammability, toxicity and disposal problem makes their use undesirable. In addition, the ability of such cleaning liquids to form true solutions with oily substances causes the accumulation of such substances therein until the cleaning liquids becomes unusable and must be disposed of as hazardous waste.

Yet another class of these approaches has been the use of plain water to suspend or entrain oily waste under conditions of high agitation, and to thereafter separate out the oily waste under conditions of low agitation. The separation phase of this approach is accomplished with a separating apparatus which takes advantage of the natural immiscibility of oil and water. Examples of separating apparatuses suitable for use with this approach are described in U.S. Pat. Nos. 4,717,475 (Brandt et al) and 3,957,656 (Castelli).

Another class of these approaches has been the use of water based cleaning liquids, such as those which use soaps or detergents, that emulsify the oily waste and take the resulting emulsion into suspension. While cleaning liquids of this type are not a fire hazard, they too accumulate oily waste until they become unusable and must be disposed of as hazardous waste.

Still another class of these approaches has been the use of water based, non-emulsifying cleaning liquids such as those which include various mixtures of surfactants, semi-polar organic solvents, wetting agents, etc. that have the ability to suspend or take up oily waste under a first range of conditions and to release that waste under a second range of conditions. The use of such cleaning liquids not only has many of the advantages that are associated with approaches that use plain water, but also has none of the disadvantages that are associated with the use of approaches that use mixtures of water and detergents. One example of a cleaning apparatus that uses non-emulsifying cleaning liquids is described in U.S. Pat. Nos. 5,232,299 (Hiss) and 5,303,725 (Hilgren). Another example of a cleaning apparatus that may use a cleaning liquid of the last-mentioned type is described in U.S. Pat. No. 4,817,649 (Schmalz et al).

Cleaning apparatuses that use emulsifying or non-emulsifying cleaning liquids are ordinarily of one of two broad types. A first of these types, hereinafter referred to as the immersion type, includes a dip tank within which the articles to be cleaned are placed within a tank containing a body of cleaning liquid having a depth sufficient to cover those articles. The second of these types, which may be referred to as the non-immersion includes a shallow basin or tray within which the articles to be cleaned are placed and exposed to the flow or spray of a cleaning liquid with which they may be scrubbed and rinsed. Intermediate types of cleaning apparatuses, e.g., apparatuses in which the articles to be cleaned are partially immersed or are both immersed and brushed, are also known. All of these types of apparatuses may include a settling tank within which part of the entrained oil may be separated from the cleaning liquid and a pump for recirculating such partially cleaned liquid to the cleaning area.

Prior to the present invention both of the above-mentioned types of washers had disadvantages which limited their usefulness. Non-immersion type washers, for example, tend to spill or splash cleaning liquid onto their surroundings and into the air. Immersion type washers, on the other hand, tend to develop a surface layer in which oily waste becomes concentrated and which can re-contaminate a cleaned article when the latter is lifted from the tank. While various types of overflow structures have been used to skim off this oil-rich surface layer and return it to the tank after most of the oil has been removed therefrom, the operation of such overflow structures is subject to disruption by the sudden changes in surface level that accompany the addition of articles into and removal of articles from the tank.

SUMMARY OF THE INVENTION

In accordance with the present invention there is provided an improved cleaning apparatus which provides many of the advantages of previously known cleaning apparatuses, but which is not subject to many of the disadvantages of such apparatuses.

More particularly, the present invention provides an improved cleaning apparatus which includes two fluidically interconnected compartments or tanks. A first cleaning tank is designed to maintain a relatively rapid closed circulation of a cleaning liquid over a part to be cleaned, while at the same time continuously expelling the fraction thereof (i.e., the surface layer) which has the greatest concentration of oily waste. A second separating tank is designed to maintain a relatively slow, unidirectional flow of the cleaning liquid continuously expelled from the cleaning tank, through a separator assembly which removes most of the oily waste therefrom, and continuously reintroduces the regenerated cleaning liquid into the cleaning tank. Together, these two linked flows maintain in the cleaning tank a body of cleaning liquid which has a low oil content under conditions that facilitate the removal of oily waste from the article to be cleaned, and simultaneously maintain in the separating tank a body of cleaning liquid which has a high oil content under conditions that facilitate the release of such oily waste.

Generally speaking the cleaning apparatus of the invention includes two tanks that are located in proximity, preferably in side-by-side relationship, to one another or, equivalently, a single tank that is divided into two adjacent compartments by a common partition wall. The upper edge of one end of these tanks is provided with an overflow that causes the light surface fraction of the liquid in the cleaning tank to flow out of the cleaning tank and onto the surface of the liquid in the separating tank. The bottom edge of the opposite end of the separating tank is provided with an outlet through which the dense bottom fraction of the liquid in the separating tank may be withdrawn and pumped back into the cleaning tank. The effect of this top/bottom relationship between outlets and inlets is to establish a density gradient which favors the migration of oily waste from the cleaning tank to the separating tank.

In addition, the manner in which flow from the cleaning tank is directed into the separating tank is chosen so that a unidirectional flow pattern is established in the separating tank, while the manner in which flow from the separating tank is directed into the cleaning tank is chosen so that a circulatory flow pattern is established in the cleaning tank. The effect of this difference in flow pattern is to establish a turbulence differential which also favors the migration of oily waste from the cleaning tank to the separating tank.

In accordance with an important feature of the invention, the above-discussed separating effects are reinforced by including within the separating tank a waste separating assembly that is specially adapted for operation under the conditions prevailing therein. In the preferred embodiment, this separating assembly includes an array of parallelly disposed rigid plates which are composed of an oleophilic material such as polypropylene, and which include large numbers of relatively small openings. In operation, these plates serve to divide the bulk flow of the cleaning liquid through the separating tank into a multiplicity of very small component flows, each of which is directed through a flow channel having a surface area which is large in relation to its flow aperture. In doing so, the plate assembly promotes and hastens the coalescence of oily waste into globules large enough to rise rapidly to the surface of the liquid in the separating tank where they can be easily removed as, for example, by absorption into an oleophilic skimming pad. This, in turn, allows cleaning liquid with a reduced oil content to be recirculated back to the cleaning tank for further use.

In accordance with another feature of the present invention, the cleaning apparatus includes a buoyant overflow member or floating weir that is positioned in fluidic series between the outlet of the cleaning tank and the inlet of the separating tank, i.e., at the boundary between these tanks. This buoyant member is preferably mounted to move upwardly and downwardly in response to changes in the difference between the height of the liquid levels in the cleaning and separating tanks. Because of its buoyancy and movability this member will come to rest in a position in which the rate of flow from the cleaning tank into the separating tank is equal to the rate at which liquid is pumped from the separating tank to the cleaning tank, without regard to the absolute height of the liquid surface in the cleaning tank. This, in turn, minimizes the extent to which and the time during which the above-mentioned beneficial flow patterns are disrupted by as a result of surface level changes that are associated with the lowering of large articles or their removal from the cleaning apparatus.

Cooperating with the buoyant member is a damming member or plate which is positioned between the above-mentioned separating assembly and the outlet of the separating tank, and which extends from a point above the bottom of the separating tank to a point above the surface of the liquid contained therein. Because of its size and its positioning in relation to the outlet and the separating assembly, this damming member creates, at the end of the separating tank, an auxiliary compartment or sub-compartment. The purpose of the damming member is to prevent the oil globules or separated oil from entering the sub-compartment of the separating tank. Because of its protected character, this auxiliary compartment is preferably used as a mounting site for switching elements, such as thermostats and float switches.

In accordance with still another feature of the present invention, there is provided a bifurcated basin-defining cover which is provided with a hinge in proximity to the boundary between the cleaning and separating tanks. Because of the location of this hinge, either of the two parts of the cover may be swung open and rotated downwardly over the other part. When the front part of this cover (i.e., the part that covers the cleaning tank) is folded back over the back part thereof, it serves as a convenient work shelf for articles being added to or removed from the cleaning tank.

DESCRIPTION OF THE PREFERRED EMBODIMENT

Figure 1:
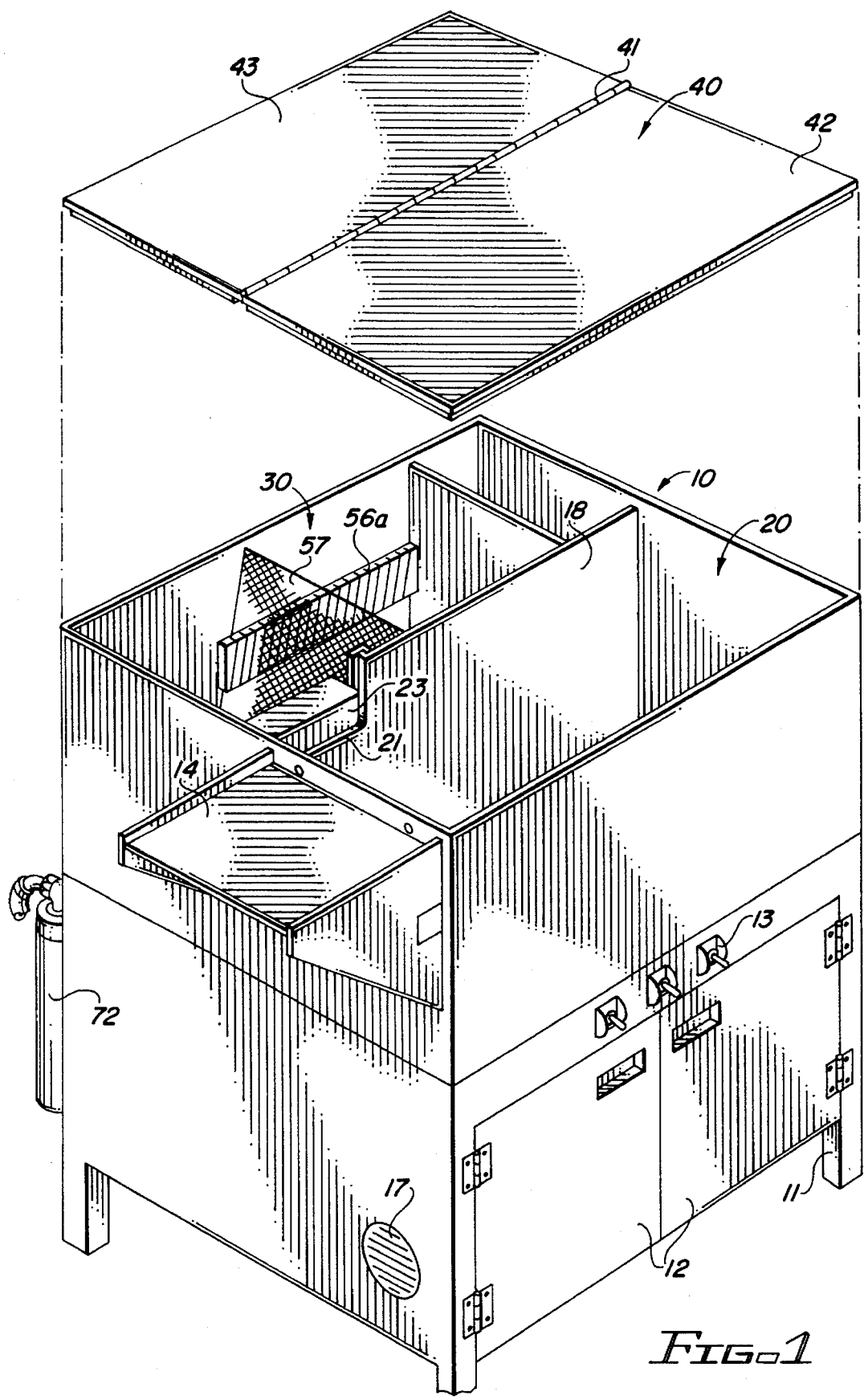
FIG. 1 is an oblique perspective view of the cleaning apparatus of this invention with the cover positioned above it as in an exploded view.

Referring to the drawings and in particular to FIG. 1, there is shown at numeral 10 a preferred embodiment of the cleaning apparatus of this invention which includes two generally rectangular shaped and fluidically connected tanks 20 and 30 for holding a cleaning liquid. Tank 20 functions as a cleaning tank and tank 30 is the separating tank. Cleaning tank 20 and separating tank 30 are separated by a partition wall 18. As shown in FIG. 1, apparatus 10 is really a single tank which is conveniently divided into two tanks, that is tank 20 and 30 by means of partition wall 18. As further shown in FIG. 1, apparatus 10 is provided with legs 11, and a removable, bifurcated cover 40 having sections 42 and 43 connected by hinge 41. Cover section 42 fits over the cleaning tank 20 and cover section 43 fits over separating tank 30. Additionally, apparatus 10 is provided with shelf 14 mounted on the exterior of the apparatus and at one end thereof where workers may conveniently place rubber gloves and the like.

Figure 7:
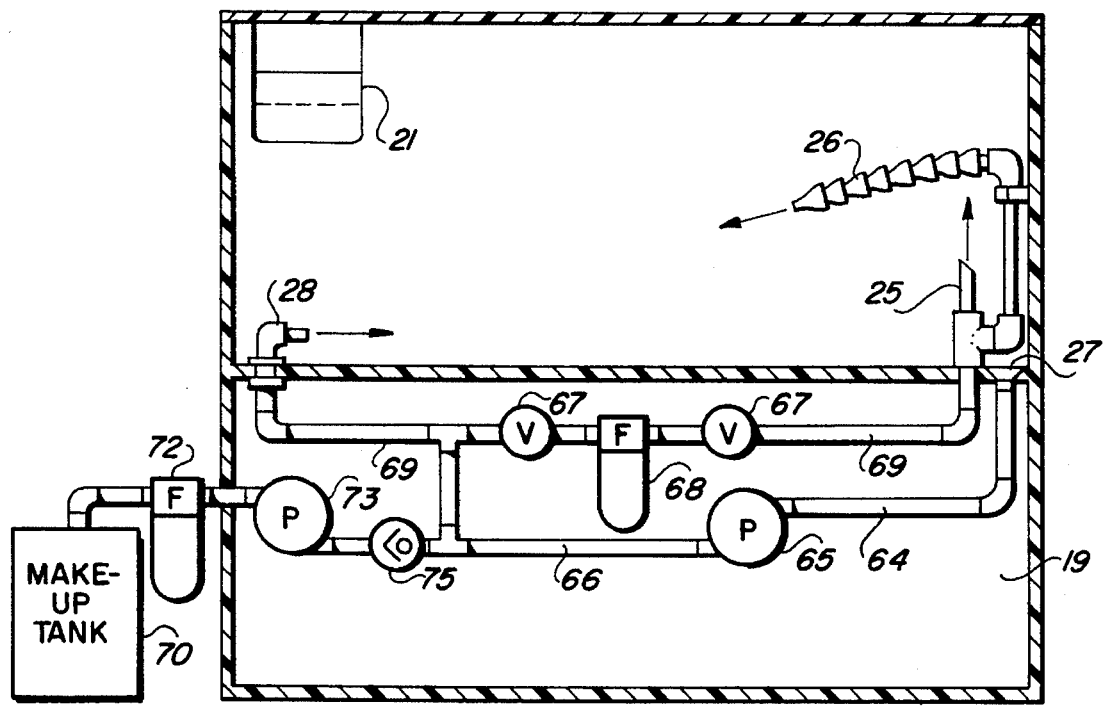
FIG. 7 is a side plan view showing a system for circulating cleaning liquid in the apparatus of this invention.

Also shown are switches 13 and doors 12 which open to a compartment 19 positioned immediately below the bottom of tanks 20 and 30. As shown in FIG. 7, compartment 19 contains the various pumps, filters, valves and the like for circulating a cleaning fluid throughout apparatus 10. Switches 13 control the power to the pumps and immersion heater. Also shown is vent 17 for compartment 19.

As earlier noted, the construction of cleaning tank 20 is such as to maintain a relatively rapid, closed circulation of a cleaning liquid over a part to be cleaned, while at the same time continuously expelling that portion of the liquid (i.e., the surface layer) which has the greatest concentration of oily waste. Separating tank 30 is designed so that a relatively slow, unidirectional flow of the cleaning liquid takes place. That is, liquid that is continuously expelled from the cleaning tank is passed through a separator assembly 50 which removes most of the oily waste and continuously reintroduces the regenerated cleaning liquid back into cleaning tank 20. Together, these two linked flows maintain in the cleaning tank a body of cleaning liquid which has a relatively low oil content under conditions that facilitate removal of oily waste from the article to be cleaned, and simultaneously maintain in the separating tank a body of cleaning liquid which has a high oil content under conditions that facilitate the release of the oily waste.

Figure 5:
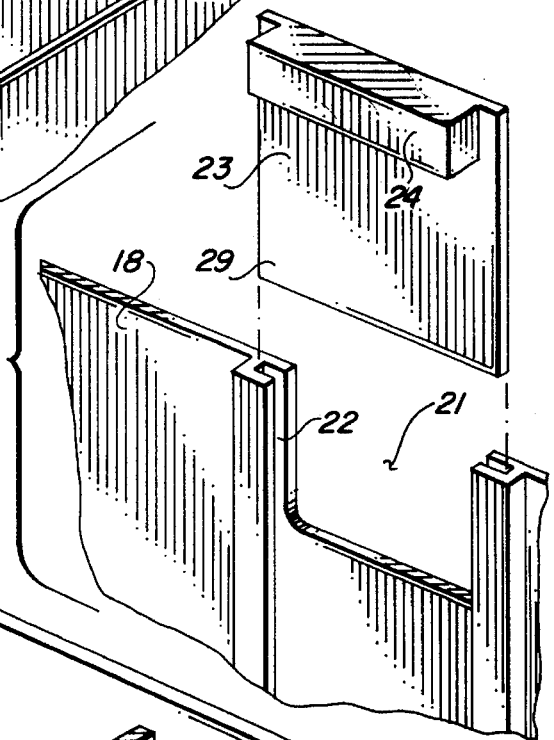
FIG. 5 is a partial view of the vertically movable means for controlling flow of cleaning liquid from the cleaning tank to the separating tank.

Located between tanks 20 and 30 is an important feature of this invention and that is buoyant overflow member 23, also called a floating weir. Floating weir 23 is positioned in fluidic series between the outlet opening 21 of the cleaning tank 20 and the inlet opening of the separating tank positioned in wall 18. In the construction shown the outlet and inlet are the same. As best shown in FIG. 5, floating weir 23 includes a generally rectangular shaped plate 29 which is slidably mounted in vertical channels 22 of partition wall 18. This particular mounting arrangement allows up and down travel to the floating weir. Mounted at the top of plate 29 is sealed chamber 24 which gives the necessary buoyancy to floating weir 23, that is, the weir is able to move up and down in response to changes in the difference in the height of the liquid level in the cleaning and separating tanks.

Figure 2:
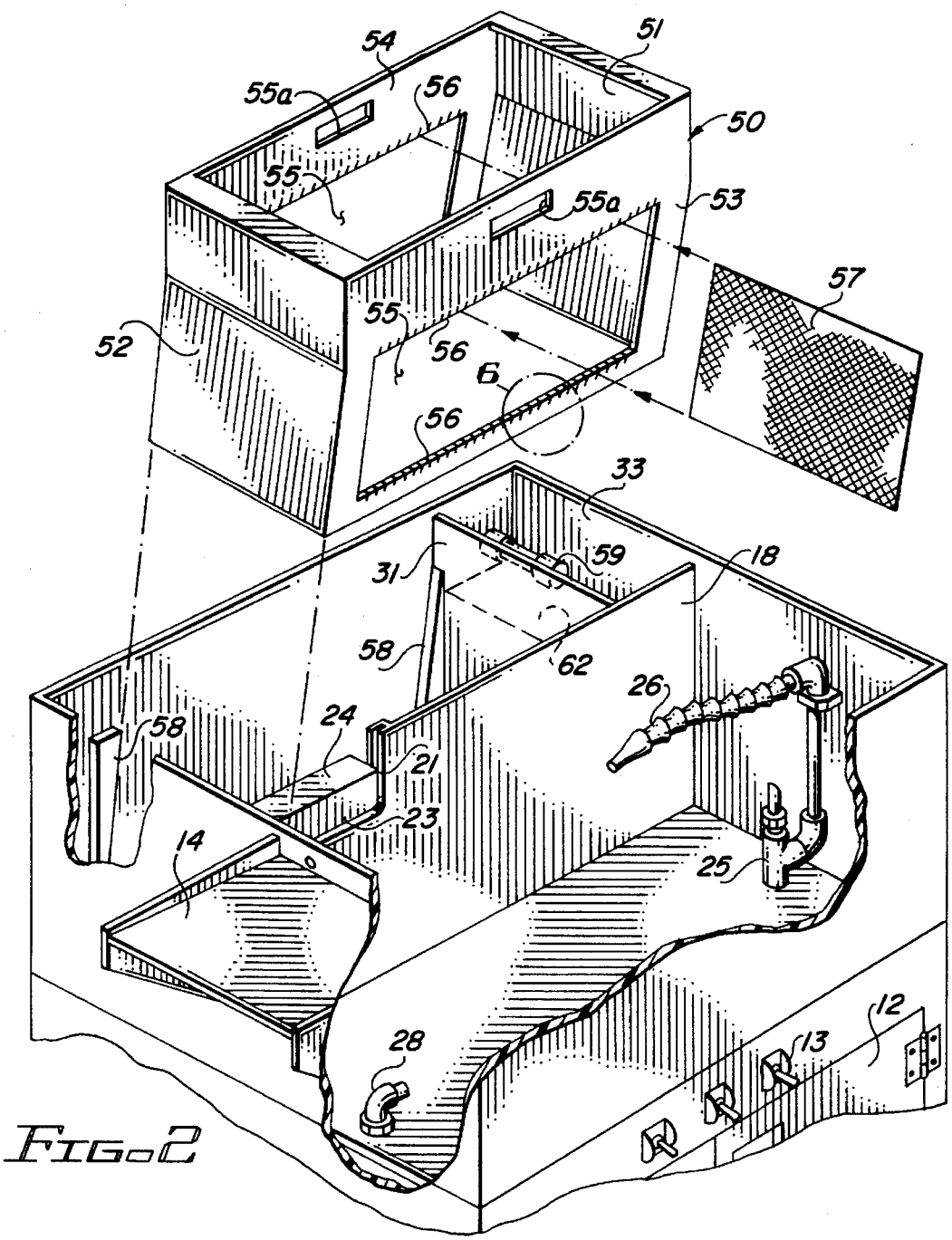
FIG. 2 is an oblique fragmentary perspective view of the apparatus with the waste separating assembly lifted therefrom.
Figure 6:
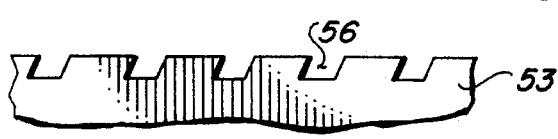
FIG. 6 is an enlarged view of the grooves which support and separate the coalescing sheets.
Figure 3:
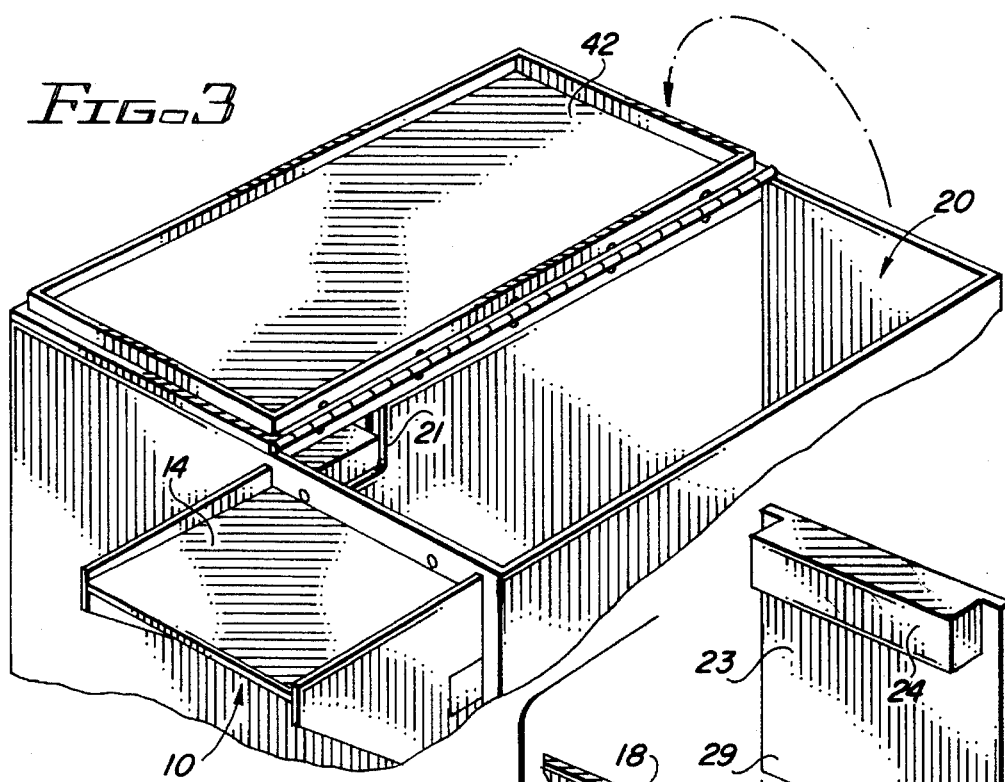
FIG. 3 is an oblique top view of the apparatus with a portion of the cover folded back exposing the cleaning tank.

Another important feature of this invention is the provision of waste separating assembly 50 in separating tank 30 which is specially adapted for operation under the conditions prevailing herein. In a preferred embodiment, and as best shown in FIG. 2, separating assembly 50 is removable from separating tank 30 and, as shown, is generally rectangular in shape with parallel side walls 53 and 54 and end walls 51 and 52. Each of the side walls is provided with an opening 55 and a much smaller openings 55a near the top of each of the side walls, which openings serve as a handle. End wall 51 of separating assembly 50 is solid and serves to tie the assembly together as a unit. Opposite front wall 52 is constructed of a rigid, oleophilic material such as polypropylene which is provided with a large number of relatively small openings. The openings are of a size that is about the thickness of the wall 52. Additionally, a plurality of parallelly disposed rigid plates, called coalescing plates 57 are slideably positioned within the interior of the separating assembly and are held in position within the interior of the separating assembly by means of notched grooves 56 at the lower and upper edges of openings 55 as well as a series of parallel grooves 56a which are positioned on the exterior wall of the separating tank. Coalescing plates 57 are planar, are composed of an oleophilic material as is wall 52, and are oriented substantially parallel to one another and in a direction that is inclined slightly to the vertical. As shown in FIGS. 1 and 2, positioned immediately adjacent to the separating assembly 50 is damming member 31. Damming member 31 is formed of a sheet of rigid material, preferably plastic, and is mounted between an exterior wall of the separating tank and partition wall 18. Although not shown, damming member is provided with a horizontal opening near the bottom of tank 30. Damming member 31 extends from the bottom of tank 30 with its upper edge being above the upper edges of the coalescing plates. The horizontal opening allows for fluid flow. Damming member 31 along with the exterior walls of the apparatus and a portion of partition 18 form a sub-compartment 33. The purpose of the damming member is to prevent the oil globules or separated oil from entering subcompartment 33 of the separating tank. It is in subcompartment 33 where the cleaning solution is ultimately transported back to the cleaning tank, as will be explained in detail later. The bottom of subcompartment 33 in the separating tank is provided with outlet 27 through which the denser bottom fraction of the liquid in the separating tank may be withdrawn and pumped back into the cleaning tank.

Figure 4:
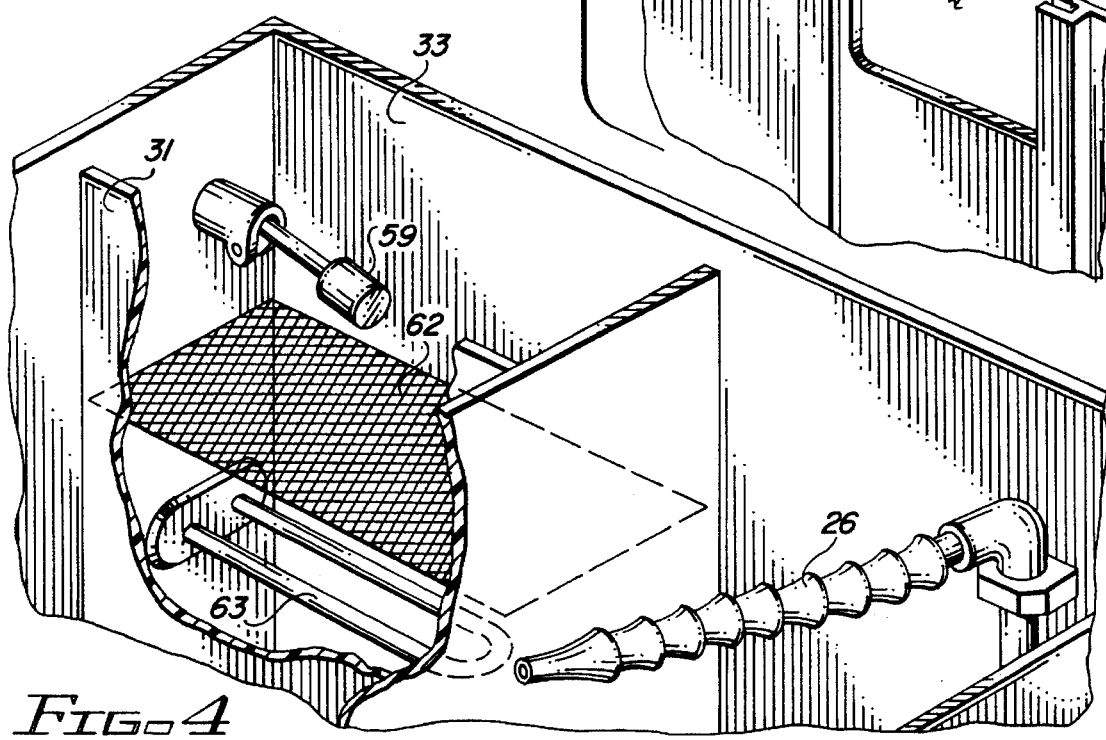
FIG. 4 is a partial fragmentary perspective view of the apparatus particularly showing one end of the apparatus.

An important feature of damming member 31 is that, as previously noted, it serves to form an auxiliary or sub-compartment 33 in separating tank 30. Because of its protected character, this auxiliary compartment or subcompartment 33 is preferably used as a mounting site for necessary elements such as thermostats and flow switches. As shown in FIG. 4, this sub-compartment is provided with float switch 59, an immersion heating element 63 as well as a horizontally mounted screen 62. The screen serves to prevent foaming of the cleaning fluid which might interfere with the operation of the float switch. The purpose of the float switch is to allow for additional cleaning fluid to be added when necessary and the immersion heater is used to heat the cleaning fluid when desirable.

Figure 8:
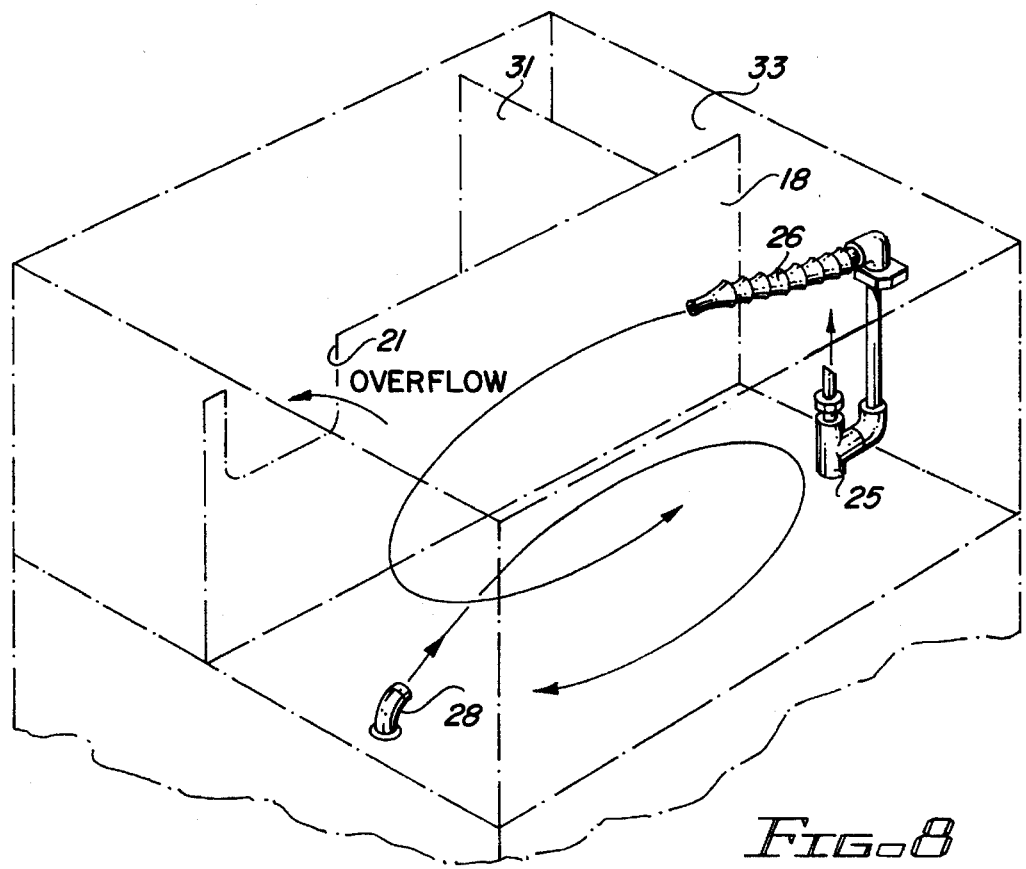
FIG. 8 is a partial perspective view of the apparatus showing fluid flow in the cleaning tank.

A further important feature of this invention is that the cleaning tank 20 is designed so that a relatively rapid closed circulation of cleaning fluid is maintained over a part to be cleaned while at the same time continuously expelling to the separating tank 30 the fraction thereof, that is the surface layer, which has the greatest concentration of oily waste. To promote this relatively rapid circulation of cleaning liquid, cleaning tank 20 is provided with inlet nozzles 25 and 28 which are positioned at each end of cleaning tank 20. In addition, a flexible wand nozzle 26 is mounted to the pipe delivering cleaning fluid to the nozzle 25 and allows for adjustment of the fluid circulation within the cleaning tank. As shown best in FIG. 8, these three nozzles in cooperation provide a rapid closed circulation of the cleaning liquid over the part to be cleaned.

The system for circulating the cleaning liquid is shown in FIG. 7. Cleaning liquid in sub-compartment 33 which is relatively free of oily waste is removed through a drain 27 in the bottom of sub-compartment 33 and is pumped by means of pump 65 through pipes 64, 66 and 69 to inlet nozzles 25 and 28 and flexible wand nozzle 26. As shown, a portion of this recycled cleaning fluid is passed through filter 68 which serves to remove any solid ingredients present in the cleaning fluid. A pair of shut-off valves 67 is provided in the line to allow a change of filter 68. In order to maintain a proper amount of cleaning fluid in the apparatus, a make-up tank 70 is mounted close to the cleaning assembly 10 and fluid from the make-up tank can be removed by means of vacuum pump 73 and supplied to the system. If desired, a filter 72 may be provided in the line leading from tank 70 to the cleaning tank 20. A ball check valve 75 is mounted in the line which prevents any cleaning fluid from the tank draining back to make-up tank 70.

In operation, a part to be cleaned is placed in cleaning tank 20, with both tanks 20 and 30 having an appropriate amount of cleaning fluid. Thereafter, the appropriate pumps and immersion heater, if necessary, are activated by means of the switches 13 and a relatively rapid closed circulation of the cleaning liquid over the part to be cleaned takes place in tank 20. Any oily waste removed from the part rises to the surface of the cleaning fluid and it is this light surface fraction of the liquid in cleaning tank 20 which flows out of the cleaning tank through overflow 21 and onto the surface of the liquid in separating tank 30. The flow of liquid takes place because the separating tank is provided with outlet 27 in the bottom sub-compartment 33 through which the dense bottom fraction of the liquid in the separating tank is withdrawn and pumped back into cleaning tank 20. The effect of this top/bottom relationship between the outlet of the separating tank and back into the cleaning tank 20 is to establish a density gradient which favors the migration of oily waste from the cleaning tank to the separating tank. Additionally, the manner in which flow from the cleaning tank 20 is directed into separating tank is chosen so that a unidirectional flow pattern is established in the separating tank while the flow pattern in the cleaning tank is of a circulatory flow pattern. The effect of this difference in flow patterns establishes a turbulence which also favors the migration of oily waste from the cleaning tank to the separating tank. Buoyant overflow member or floating weir 23 is positioned between the outlet 21 of the cleaning tank and the inlet of the separating tank. As shown, it is at the boundary between the two tanks. Floating weir 23 moves upwardly and downwardly in response to changes in the difference between the height of the liquid levels in the cleaning and separating tanks. Because it is buoyant and movable, this member comes to rest in a position in which the rate of flow from the cleaning tank into the separating tank is about equal to the rate at which liquid is pumped from the separating tank back to the cleaning tank, without regard to the absolute height of the liquid surface in the cleaning tank. This, minimizes the extent to which and the time during which the flow patterns are disrupted as a result of surface level changes that are associated with the lowering of large articles into the cleaning tank or their removal therefrom.

For example, removal of a large article from cleaning tank 20 will cause the fluid level in the tank to drop significantly. Were it not for floating weir 23, oily waste on the surface of the fluid in the separating tank might well flow back into the cleaning tank.

As the oily waste is guided into the separating tank 30, it passes through waste separating assembly 50. As noted, end 52 of assembly 50 is composed of an oleophilic material such as polypropylene and which is provided with a large number of relatively small openings. After passing through perforated end 52 the waste laden cleaning fluid passes through the series of coalescing plates or sheets 57. Again, as with end plate 52, coalescing sheets 57 are made of an oleophilic material, such as polypropylene, and also are provided with large numbers of relatively small openings. In operation, such plates serve to divide the bulk flow of the cleaning liquid through the separating assembly into a multiplicity of very small component flows, each of which is directed through a flow channel having a surface area which is large in relation to its flow aperture. Thus, the coalescing plates promote and hasten the coalescence of oily wastes into globules large enough to rise rapidly to the surface of the liquid in the separating tank where they can be easily removed as, by absorption onto an oleophilic skimming pad. Damming member 31 is positioned between separating assembly 50 and outlet 27 of the separating tank and it extends from the bottom of the separating tank to a point above the surface of the liquid in the separating tank. As earlier noted, the damming member is provided with a horizontal opening which is placed near the bottom of the tank and this opening allows relatively clean cleaning solution to be transported back to the cleaning tank via the pump and filter system as shown in FIG. 7.

What is claimed is:

1. An improved cleaning apparatus for removing oily waste from articles to be cleaned using a water based cleaning liquid including, in combination:
    (a) a cleaning tank having a bottom wall and a plurality of side walls, and having an outlet and at least one inlet, said cleaning tank serving as means for holding an article in contact with a flow of said cleaning liquid and thereby causing relatively small globules of oleophilic waste material to become suspended in said cleaning solution, the liquid in said cleaning tank defining a first surface when said article is present within said cleaning tank;
    (b) a separating tank having a bottom wall and a plurality of side walls, and having an inlet located in proximity to one end said tank and connected to receive cleaning liquid flowing out of the outlet of the cleaning tank and an outlet located in proximity to the opposite end of said tank and to said bottom wall, said separating tank serving as means for holding cleaning liquid received from said cleaning tank for a time sufficient for a substantial fraction of said relatively small globules to coalesce into relatively large globules, the liquid in said separating tank defining a second surface;
    (c) a plurality of coalescing plates disposed within said separating tank between the inlet and the outlet thereof, each of said plates having a lower edge and sides that extend into proximity with the bottom and side walls, respectively of the separating tank and having an upper edge, and defining a plurality of openings therethrough;
    (d) means for pumping cleaning liquid from the outlet of said separating tank to the inlet of said cleaning tank; and
    (e) vertically movable means positioned between the outlet of the cleaning tank and the inlet of the separating tank for allowing cleaning liquid in said cleaning tank to flow into said separating tank when said first surface is higher than said second surface.

2. The cleaning apparatus of claim 1 in which said vertically movable means comprises a floating gate member which moves upwardly and downwardly in response to changes in the heights of said first and second surfaces.

3. An improved cleaning apparatus for using a water based cleaning liquid to remove oily waste from an article to be cleaned comprising, in combination:
    (a) a tank having a bottom wall and a plurality of side walls,
    (b) a partition wall for dividing said tank into a first cleaning compartment for holding a first body of cleaning liquid having a first surface, and a second, separating compartment for holding a second body of cleaning liquid having a second surface, each of said compartments having a first end and a second end;
    (c) at least one first inlet for carrying a flow of cleaning liquid into said first compartment;
    (d) a first outlet located at the first end of said first compartment, in proximity to said first surface, for carrying a flow of cleaning liquid out of said first compartment;
    (e) a second inlet located at the first end of said second compartment in proximity to said second surface, said second inlet being connected in liquid receiving relationship to said first outlet;
    (f) a second outlet located at the second end of said second compartment, in proximity to said bottom wall, for conducting a flow of cleaning liquid out of said second compartment, said outlet being connected in liquid supplying relationship to said at least one first inlet;

(g) a plurality of coalescing plates within said second compartment, each of said plates being positioned between said second inlet and said second outlet and having an orientation that is roughly perpendicular to the direction of flow from said second inlet and said second outlet, each of said plates defining a plurality of openings and having dimensions that allow the upper edges of said plates to lie beneath said second surface; and (h) pumping means connected to said second outlet for pumping cleaning liquid from said separating tank and into said cleaning tank.

4. The cleaning apparatus of claim 3 in which the first outlet of said first compartment and the second inlet of said second compartment have a common boundary, further including a weir member, located at said boundary for conducting of flow of cleaning liquid from said first compartment into said second compartment when said first surface lies above said second surface.

5. The cleaning apparatus of claim 4 in which said weir member is sufficiently buoyant to float in said cleaning liquid and to move upwardly and downwardly in response to changes in the height of said first surface and second surface.

6. The cleaning apparatus of claim 5 further including guiding means, slidably attached to said weir member, for guiding the upward and downward motion of said weir member.

7. The cleaning apparatus of claim 3 further including a damming plate, located between said coalescing plates and said second outlet, said damming plate having:

(i) sides that extend into proximity to the walls of the second compartment, (ii) an opening in the lower portion of said plate to allow passage of liquid, and (iii) an upper edge that lies above the upper edges of said coalescing plates, whereby said damming plate defines a chamber at the second end of the second compartment.

8. The cleaning apparatus of claim 7 including a float switch located within said chamber, a source of fresh cleaning solution, and a pump responsive to said float switch for pumping fresh cleaning solution from said source to said tank when the height of said second surface falls below a predetermined value.

9. The cleaning apparatus of claim 7 including a thermostatically controlled heating element mounted within said chamber to raise the temperature of the liquid in proximity to said second outlet prior to its being pumped into said cleaning tank.

10. The cleaning apparatus of claim 3 further including a cover adapted to fit over said tank, said cover:

(a) having a first section sized and shaped to fit over said first compartment;

(b) a second section sized and shaped to fit over said second compartment;

(c) a hinge joining said first and second sections so that said first section may be folded back over said second section to uncover said first compartment while said second compartment remains covered.

11. The cleaning apparatus of claim 10 in which the first section of said cover, when folded back over the second section of said cover, defines an upwardly open basin for receiving liquid drained from articles removed from said first compartment and placed thereon after cleaning.

12. The cleaning apparatus of claim 11 in which the walls of said basin define drain holes for allowing said drained liquid to run back into said first compartment.

13. The cleaning apparatus of claim 3 in which said at least one first inlet includes at least two first inlets which are oriented so that the liquid emerging therefrom causes the cleaning liquid in said first compartment to circulate over said article.

14. The cleaning apparatus of claim 3 in which said cleaning compartment includes at least one recirculating inlet and at least one recirculating outlet, and a recirculating pump connected between said recirculating inlets and outlets to recirculate cleaning liquid within said cleaning compartment, thereby increasing the bulk rate of flow of cleaning liquid within said cleaning compartment without increasing the bulk rate of flow of cleaning liquid within said separating tank.

15. The cleaning apparatus of claim 3 in which said coalescing plates are substantially planar, are composed of an oleophilic material, and are oriented substantially parallel to one another in a direction that is inclined with respect to the vertical.

16. The cleaning apparatus of claim 15 in which said openings have sizes roughly comparable to the thickness of said plates.

17. The cleaning apparatus of claim 15 in which said plates are connected together by a supporting frame to form a composite structure that is adapted to be inserted into and removed from said separating compartment as a unit.

* * * * *